Patented May 15, 1934

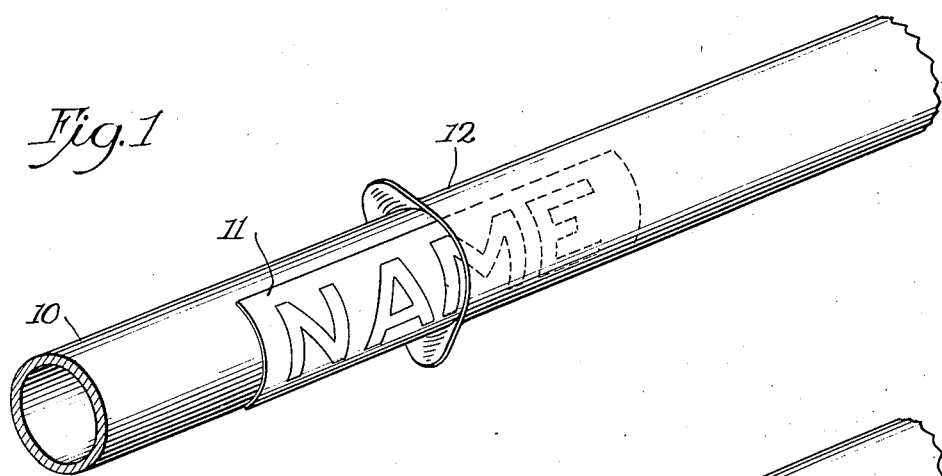
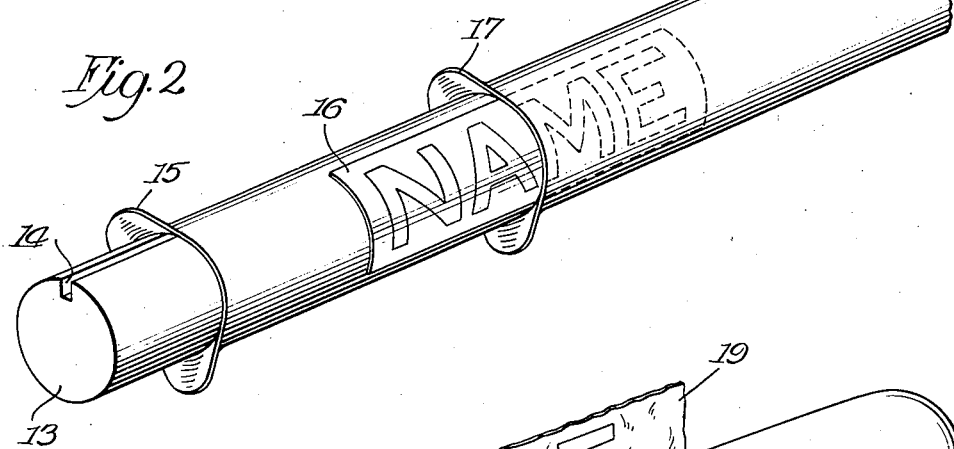
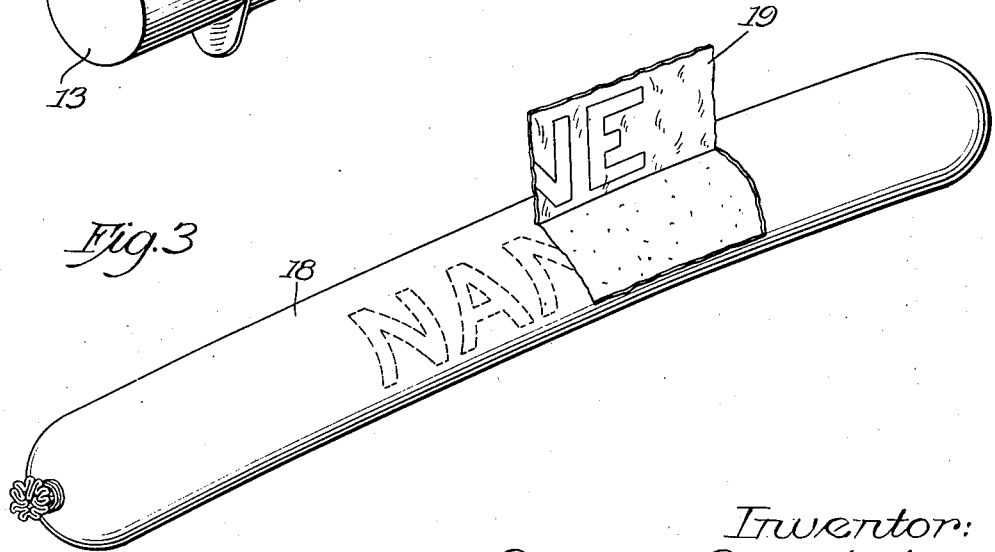

1,958,588

UNITED STATES PATENT OFFICE 1,958,588

METHOD OF MARKING SAUSAGE CASINGS

Seymour Oppenheimer, Chicago, Ill., assignor to Oppenheimer Casing Company, Chicago, Ill., a corporation of Illinois Application June 6, 1932, Serial No. 615,626

2 Claims. (Cl. 41—33)

My invention relates to casings formed from animal intestines which are customarily filled with meat of various kinds to form sausages, bolognas, and the like, and more particularly to a novel method for incorporating therewith various forms of indicia, such as brands or trade-marks and the like.

One object of my invention is to devise a method of applying to sausage casings formed from animal intestines indicia which is substantially a part of, and portrayed directly on, the material composing the casing while the latter is in a soft and pliable condition prior to being filled with meat, thus avoiding any necessity for extraneous devices in the finished casing, such as separately printed labels and the like.

A further object is to devise a method of the character indicated which avoids any possibility of the print running or becoming smeared by the moist casing, and which effects a serviceable transfer of the indicia to the casing material.

In the marketing of bologna, tongue-sausages and similar types of sausage products which are enclosed by casings, it is commercially desirable that the product carry a label or other device indicating its trade-mark, brand, name of proprietor, or similar insignia, and that this label be affixed directly to the casing by some means other than a string attached tag. It is well known that the best sausage casings are made from animal intestines because of their native capacity for permitting a "breathing" of the meat filling, but their natural moist condition precludes the use of stamps or other devices for applying the printed design directly to the casing.

The present invention is intended to solve this problem by incorporating in the casing when it is manufactured the desired form of indicia which is applied directly to the material composing the casing. According to my improved method, the indicia is capable of application to either the single or lined type of casing and the method employed involves the transfer of the print or design from a sheet of "Cellophane", to which the print is originally applied, to the surface of the casing under the action of heat, as more particularly described hereinafter. After transfer, the "Cellophane" is removed, leaving the design directly on the sausage casing. The location of the design is preferably on the inner surface of a single casing, or, in the lined type of casing, on the external surface of the inner casing, or the inner surface of the outer casing, although it may be applied to the outer surface of the casing.

These and further objects of my invention will be set forth in the following specification, reference being had to the accompanying drawing, and the novel means by which said objects are effectuated will be definitely pointed out in the claims.

In the drawing:

Figure 1 is a perspective view showing the initial step in the manufacture of a single sausage casing.

Fig. 2 is also a perspective view showing a double sausage casing in process of manufacture, the mandrel or arbor employed being slightly different from that shown in Fig. 1.

Fig. 3 is a perspective view of a filled casing, such as a bologna, a portion of the casing being lifted to expose the indicia on the inner surface thereof.

Referring to Fig. 1, the numeral 10 designates a pipe which, in external appearance, is generally similar to the arbor or mandrel that is customarily used in the casing industry to receive the animal intestines which are drawn thereover in order to build up a complete casing, except that the pipe is lacking in the longitudinal groove along which the casings are slitted. The illustration in Fig. 1 is more particularly intended as an exemplification of the application of my invention to a single sausage casing, that is, a casing having only a single thickness.

The numeral 11 designates a sheet of "Cellophane" having a waterproof coating and on the surface of which is originally applied by means of printing ink or other materials, the design or mark which it is desired to apply to the casing. The particular shape of the sheet 11 forms no part of the present invention, as this factor will primarily depend upon the nature of the design and the size and shape of the sausage casing, but, in any case, it is contemplated that this "Cellophane" will be of a character now customarily employed in wrapping various forms of articles for market.

In the practice of the method, the printed sheet of "Cellophane" is first applied to the outer surface of the pipe 10 and held in this position while the intestine 12 which has been previously dipped in a brine solution, as is customary in the casing industry, is drawn thereover in the general manner illustrated in Fig. 1. After the intestine has been fully positioned, steam, hot water, hot air, or any desired form of heating agent is circulated through the pipe for a time, dependent upon the nature of the design being transferred and the condition of the intestine, a factor which is under the control and constant inspection of the operator. In no case, however, is the temperature, to which the "Cellophane" and intestine casing are subjected, permitted to rise above the boiling point.

During the foregoing action, it is supposed that the brine solution on the intestine casing either dissolves, loosens, or splits the waterproof coating on the "Cellophane" which carries the design and that in some manner, the design thereafter becomes affixed to the casing itself. It will be understood, however, that the precise nature of the action is not thoroughly understood, but whatever happens, the design does transfer from the "Cellophane" sheet to the intestine casing, so that it is thereafter possible to strip the casing from the pipe 10, with the complete design affixed thereto. The "Cellophane" sheet that has been used may then be disposed of in any manner.

In Fig. 2 is illustrated a further modification of the method which more particularly refers to the double type of casing. In this case, the numeral 13 indicates a round stick having a longitudinal groove 14, which is of the general type now employed in the casing industry for the manufacture of double or sewn types of casings. When using this stick, a casing 15 will first be drawn thereover, a printed sheet 16 of "Cellophane" will be applied to the surface of the casing 15, and thereafter a second casing 17 is drawn over the "Cellophane" sheet and casing 15.

In this instance, the stick 13 and its associated casings are exposed to a steam bath, or any other desired form of heat, the heat being applied externally, and the temperature maintained below the boiling point, until, as determined by the inspection of the operator, it has been ascertained that a satisfactory transfer of the design to the inner surface of the casing 17 has been attained. Thereafter, the casing 17 may be slipped back sufficiently to permit the withdrawal of the "Cellophane" sheet, after which both casings may be withdrawn together. If it is desired to make a sewn type of casing, then, upon the completion of the transfer step of the method, a knife is inserted in the groove 14 and drawn along the stick 13 to completely sever the concentric casings 15 and 17, in order to form a pair of superimposed sheets, from between which the "Cellophane" sheet 16 may be extracted for subsequent disposal. Thereafter, a second pair of casings may be drawn over the stick 13 and slitted, as is well known in the art, for subsequent attachment to the slitted casings 15 and 17 by sewing.

In Fig. 3 is illustrated a filled casing 18 with a portion 19 thereof lifted to expose the design affixed to the interior surface thereof. In the double type of casing, this design would be affixed either to the inner surface of the outer casing, or to the outer surface of the inner casing, as the choice of the operator dictates. Owing to the semi-transparent condition of the casing, it will be obvious that the disposition of the indicia on the inner surface of the casing does not interfere with its easy observation. Moreover, the design is protected from abrasions, due to handling, and also against surreptitious removal.

The reference to "Cellophane" as being the preferred material to use in effecting a transfer of the indicia is not to be restrictively construed as it is obvious that other materials having equivalent characteristics may be employed without departing from the spirit of the invention as defined in the appended claims.

I claim:

1. The method of applying indicia to an animal intestine, sausage casing which consists in applying to the surface of a moist casing a sheet of "Cellophane" bearing the indicia, and subjecting the sheet and casing to heat to thereby effect a transfer of the indicia to the surface of the casing.

2. The method of applying indicia to an animal intestine, sausage casing which consists in applying a sheet of "Cellophane" bearing the indicia to the surface of an arbor, drawing a moist casing over the arbor and sheet, then exposing the casing and sheet to a heating agent to thereby effect a transfer of the indicia to the surface of the casing, and thereafter removing the remainder of the "Cellophane".

SEYMOUR OPPENHEIMER.